(12) United States Patent
Takahashi et al.

(10) Patent No.: US 6,474,302 B2
(45) Date of Patent: Nov. 5, 2002

(54) KNOCK CONTROL APPARATUS FOR INTERNAL-COMBUSTION ENGINE

(75) Inventors: Yasuhiro Takahashi, Tokyo (JP); Koichi Okamura, Tokyo (JP); Mitsuru Koiwa, Tokyo (JP); Tsutomu Morishita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 175 days.

(21) Appl. No.: 09/728,089

(22) Filed: Dec. 4, 2000

(65) Prior Publication Data

US 2001/0050071 A1 Dec. 13, 2001

(30) Foreign Application Priority Data

Jun. 12, 2000 (JP) .......................... 2000-174965

(51) Int. Cl.[7] .............................. F02P 5/15; G01L 23/22
(52) U.S. Cl. ............................ 123/406.21; 123/406.28; 123/406.13; 123/406.37; 123/406.16; 701/111
(58) Field of Search .................. 123/406.21, 406.12, 123/406.13, 406.26, 406.28, 406.37, 406.16, 406.65; 701/111, 114, 115; 73/117.3

(56) References Cited

U.S. PATENT DOCUMENTS

| | | | | |
|---|---|---|---|---|
| 4,357,919 A | * | 11/1982 | Hattori et al. ......... | 123/406.16 |
| 4,599,982 A | * | 7/1986 | Sugiura ................. | 123/406.37 |
| 5,038,735 A | * | 8/1991 | Hosoya et al. ......... | 123/406.21 |
| 5,054,448 A | * | 10/1991 | Matsuoka et al. ..... | 123/406.16 |
| 5,060,615 A | * | 10/1991 | Hashimoto et al. .... | 123/406.16 |
| 5,144,929 A | * | 9/1992 | Hosoya et al. ......... | 123/406.21 |
| 5,694,900 A | | 12/1997 | Morita et al. .......... | 123/406.21 |
| 6,328,016 B1 | * | 12/2001 | Takahashi et al. ..... | 123/406.37 |

FOREIGN PATENT DOCUMENTS

JP  11-013612  1/1999  ............ F02P/5/152

* cited by examiner

Primary Examiner—Hieu T. Vo
(74) Attorney, Agent, or Firm—Sughrue Mion, PLLC

(57) ABSTRACT

To obtain a knock control apparatus for internal-combustion engine having a function of judging whether or not the causes for failure have been solved for returning to normal knock control at the time of the solution, and capable of easily judging failure even in a failure mode in which it is difficult to raise the filter value and it is difficult to judge the failure. A fail control means 4 includes: a failure judgment unit 4 for judging failure for each cylinder based on output from a background level setting unit 2 and a knock suppression and control unit 3; number of fail cylinders judgment unit 42 for judging the number of fail cylinders based on output from the failure judgment unit 41; a retard angle changing unit 43 for changing at least the real retard angle of a fail cylinder based on output from the knock suppression and control unit 3, the failure judgment unit 41 and the number of fail cylinders judgment unit 42; and a normal judgment returning unit 44 for returning to normal ignition timing retard when a cylinder under judgment for failure meets normal judgment requirements based on the output from the background level setting unit 2 and the retard angle changing unit 43.

11 Claims, 6 Drawing Sheets

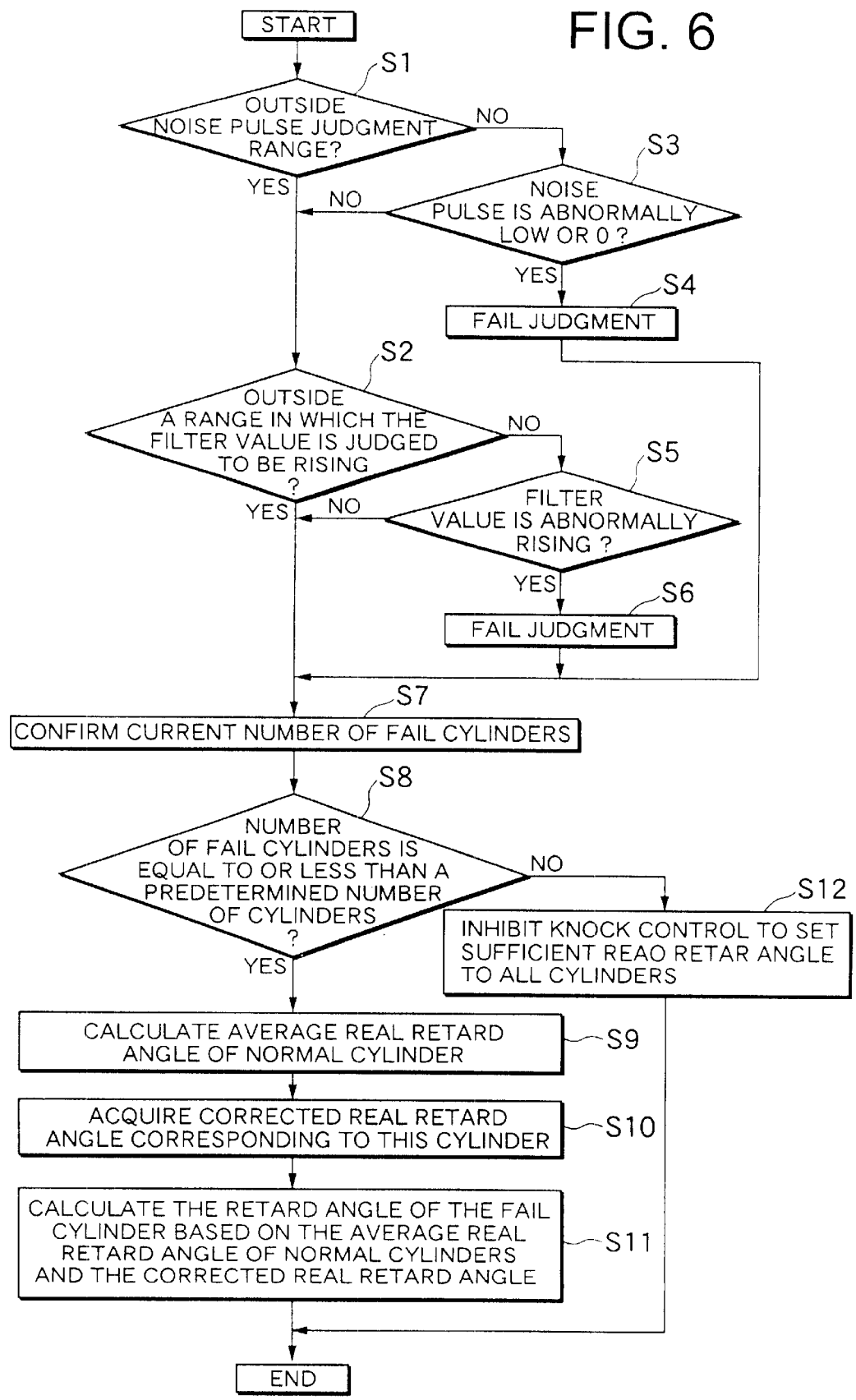

KNOCK CONTROL APPARATUS FOR INTERNAL-COMBUSTION ENGINE

BACKGROUND OF THE INVENTION

1. Field of the Invention

The present invention relates to a knock control apparatus for internal-combustion engine, which detects ionization of combustion gas produced by combustion in an internal-combustion engine as ionic current, judges occurrence of a knock based on output from an ionic current detection device for detecting its combustion state, and performs control in order to avoid the knock.

2. Description of Related Art

In an ignition type internal-combustion engine (hereinafter, referred to as engine), a mixture of air and fuel to be introduced into a combustion chamber (hereinafter, referred to as cylinder) is compressed by a piston, and is burned by igniting with an ignition plug to take out power. The engine output and ignition timing relative to the cylinder position are closely related to each other, and generally when the ignition timing is advanced, high output can be obtained. In the case of excessive spark-advance, an abnormal combustion state called "knocking (knock)" occurs, and if the knocking continuously occurs, the engine may be broken.

When the mixture is burned within the cylinder, combustion gas is ionized, and therefore, when voltage is applied to it, current flows by the ionic action. This current is called "ionic current," and sensitively varies in accordance with the combustion state within the cylinder. Therefore, it has been known that the combustion state (knocking state) can be detected by detecting the ionic current.

The ionic current is abruptly increased immediately after the ignition, and reaches the peak in a short time, and then gradually decreases. In the case where knocking occurs, a vibration component of several kHz is superimposed on the ionic current. On the basis of result of extraction of the vibration component corresponding to the knocking from the ionic current, the occurrence of knocking is judged, whereby when retard of the ignition timing is performed, high output can be obtained with the strength of the knocking and the frequency of its occurrence restrained.

As regards a knock control apparatus using ionic current, there has been previously proposed, by the present patent applicant, a knock control apparatus for internal-combustion engines provided with failure judgment means for judging an ionic current detection system for failure on the basis of, for example, the output from knocking strength detection means. When the output state of noise from each cylinder is judged in an operating range, in which noise ought to be detected, and the noise pulse output is obviously small, or when the filter value exceeds a predetermined value, this failure judgment means judges the cylinder concerned to be abnormal. Also, a retard angle for each cylinder will be determined in accordance with the number of cylinders which have been judged abnormal.

Hereinafter, with reference to FIG. 6, the detailed description will be made of a conventional example.

FIG. 6 is a flowchart showing failure judgment and control during failure according to the conventional example.

First, it is judged whether or not the operating condition is within a noise pulse judgment range (Step S1). If the noise pulse number is abnormally low or 0 (Step S3), this cylinder will be fail-judged (Step S4). Next, it is judged whether or not the operating condition is within a range in which the filter value is judged to be rising (Step S2). If the filter value is abnormally rising (Step S5), the cylinder will be fail-judged (Step S6).

Subsequently, the current number of fail cylinders is counted (Step S7), and it is judged whether or not the number of fail cylinders is equal to or less than a predetermined number of cylinders (Step S8). If not, the knock control will be inhibited to set a sufficient retard angle to all the cylinders (Step S12). If the number of fail cylinders is equal to or less than the predetermined number of cylinders, an average retard angle of the cylinders which are judged normal will be calculated (Step S9). A corrected retard angle corresponding to this cylinder will be acquired (Step S10), and the retard angle corresponding to this fail cylinder will be operated and set on the basis of the average retard angle of normal cylinders and the corrected retard angle (Step S11).

BRIEF SUMMARY OF THE INVENTION

Object of the Invention

By the use of the knock control apparatus for internal-combustion engines proposed previously, it is possible to inhibit judgment of knocking for avoiding misjudgment of knocking and to perform ignition timing control based on safe ignition timing when, for example, high frequency noises are superimposed on ionic current to output a large quantity of noise signals, and when ionic current in some cylinders cannot be detected because of disconnected wiring in a vehicle body, failure of an ionic current detection circuit or the like.

In the conventional examples, however, there has not been proposed such a process as to stop failure judgment for returning to ordinary knock control when the detection state is continuously monitored and a normal state is recognized even after the failure judgment is performed. Therefore, for example, in the case where the engine is operated at a rich air fuel ratio, when soot temporarily adheres to plugs, when temporarily affected by radio wave of high intensity, when the engine has returned to a normal state by replacing the plugs although plug contamination advances and the degree of noise superimposition increases, or the like, temporarily noise superimposition has occurred, but when it is solved, the failure judgment cannot be stopped, but the engine cannot be returned to normal knock control.

In the case where the engine is operated at a rich air fuel ratio, when soot temporarily adheres to the plugs or the like, it has been experimentally found out that no noise superimposition occurs for each ignition, nor is the filter value so much raised, and it is difficult to judge failure by the filter value raised.

The present invention has been achieved in order to solve the above described problems, and is an object to obtain a knock control apparatus for internal-combustion engines having a function of judging whether or not the causes for failure have been solved for returning to ordinary knock control at the time of the solution, and capable of easily judging failure even in a failure mode in which it is difficult to raise the filter value and it is difficult to judge the failure in the conventional examples.

SUMMARY OF THE INVENTION

According to the invention of claim 1, there is provided a knock control apparatus for internal-combustion engines, provided with: ionic current detection means for generating a signal corresponding to knocking based on the ionic current; background level setting means for filter-processing a knock detected signal value from the ionic current detection means to set a background level, which serves as a knocking criterion, based on the filter value; knock suppression and control means for judging the knocking based on the knock detected signal value and the background level to control at least ignition timing retard; and fail control means for performing control when knock detection cannot be properly performed, wherein the fail control means is provided with: failure judgment means for judging failure for each cylinder based on output from the background level setting means and the knock suppression and control means; number of fail cylinders judgment means for judging a number of fail cylinders based on the output from the fail judgment means; retard angle changing means for changing at least the retard angle of a fail cylinder based on the output from the knock suppression and control means, the fail judgment means and the number of fail cylinders judgment means; and normal judgment returning means for returning to normal ignition timing retard when a cylinder during fail judgment meets normal judgment requirements based on the output from the background level setting means and the retard angle changing means. According to such structure, there are effects that it is possible to return to failure judgment for each cylinder, retard during failure, and normal knock control during normal judgment.

According to the invention of claim 2, there is provided a knock control apparatus for internal-combustion engines specified in claim 1, wherein the failure judgment means judges, to be defective, a cylinder having a retard angle, which is a predetermined angle or more larger than a minimum value among retard angles of each cylinder. According to such structure, there is an effect that it is possible to judge, to be defective, a cylinder which has an obviously erroneous retard angle.

According to the invention of claim 3, there is provided a knock control apparatus for internal-combustion engines specified in claim 1, wherein the background level setting means performs the filter processing for each cylinder and the failure judgment means judges, to be defective, a cylinder whose filter value exceeds a predetermined value. According to such structure, there is an effect that it is possible to judge, to be defective, a cylinder having a large degree of superimposed noise on ionic current.

According to the invention of claim 4, there is provided a knock control apparatus for internal-combustion engines specified in any of claim 1, wherein if the number of fail cylinders exceeds a predetermined number of cylinders, the retard angle changing means nullifies the retard angles for all the cylinders with respect to the ignition timing control and corrects the ignition timing for all the cylinders by the use of a predetermined retard angle. According to such structure, there is an effect that it is possible to operate the engine with safe ignition timing if the knock control performance cannot be secured because of excessive fail cylinders.

According to the invention of claim 5, there is provided a knock control apparatus for internal-combustion engines specified in claim 4, wherein the predetermined retard angle is set at least based on either the intake temperature or the engine cooling water temperature. According to such structure, there is an effect that it is possible to control ignition with safe ignition timing on the spark-advance side avoiding any excessive phase lag.

According to the invention of claim 6, there is provided a knock control apparatus for internal-combustion engines specified in claim 1, wherein if the number of fail cylinders is under a predetermined number of cylinders, the retard angle changing means nullifies the retard angles for the fail cylinder with respect to the ignition timing control and sets the retard angle for the fail cylinder based on the retard angle for a cylinder, which has not been judged to be defective, to correct the ignition timing for the cylinder concerned based on the retard angle for the fail cylinder. According to such structure, there is an effect that it is possible to provide the fail cylinder with an adequate retard angle.

According to the invention of claim 7, there is provided a knock control apparatus for internal-combustion engines specified in claim 6, wherein the retard angle changing means brings an amount of correction in ignition timing of a fail-judged cylinder close to the retard angle for the fail cylinder at a predetermined speed. According to such structure, there is an effect that it is possible to change to the target amount of correction in the ignition timing without abruptly changing the ignition timing.

According to the invention of claim 8, there is provided a knock control apparatus for internal-combustion engines specified in claim 1, wherein the normal judgment returning means judges that at least the retard angle of the fail cylinder is not a predetermined angle or more larger than the retard angles of the other cylinders, and that the filter value of the fail cylinder is equal to or less than the predetermined value, and stop failure judgment. According to such structure, there is an effect that it is possible to return to the original ignition timing control after whether or not knocking can be normally detected is verified.

According to the invention of claim 9, there is provided a knock control apparatus for internal-combustion engines specified in claim 8, wherein if a number of fail-judged cylinders is under a predetermined number of cylinders, when it stops failure judgment for any of the fail-judged cylinders, the normal judgment returning means replaces the retard angle of the cylinder concerned with a retard angle having the maximum value among retard angles of the cylinders, which have not been judged to be defective, and makes the retard angle of the cylinder concerned effective with respect to the ignition timing control. According to such structure, there is an effect that it is possible to start with the optimum retard control when returning to the original ignition timing control.

According to the invention of claim 10, there is provided a knock control apparatus for internal-combustion engines specified in claim 8, wherein if the number of fail-judged cylinders exceeds a predetermined number of cylinders, the normal judgment returning means stops failure judgment for some fail-judged cylinders; if the number of fail cylinders is under the predetermined number of cylinders, the retard angle for any cylinders other than the fail cylinders is replaced with a retard angle a predetermined angle smaller than the predetermined retard angle, and is made effective for the ignition timing control; and the retard angle for the fail cylinder is nullified for the ignition timing control, and the ignition timing of the cylinder concerned is corrected based on the maximum value among the retard angles of cylinders which have not been judged to be defective. According to such structure, there is an effect that any cylinders other than the fail cylinders can be returned to the ignition timing control based on the original knock control from the safety-side ignition timing control.

Further, according to the invention of claim 11, there is provided a knock control apparatus for internal-combustion engines specified in claim 10, wherein the predetermined angle is equal to an increase in the maximum retard angle which can be increased by one knock detection. According to such structure, there is an effect that even if the retard angle on returning to the ignition timing control using the original knock control should be insufficient for the occurrence of the knock, it is possible to return to the original safety-side retard angle by one great knock judgment.

BRIEF DESCRIPTION OF THE DRAWINGS

FIG. 6 is a conceptual view showing knock control flow in a conventional apparatus.

DETAILED DESCRIPTION OF THE PREFERRED EMBODIMENTS

Hereinafter, with reference to the drawings, a description will be made of embodiments according to the present invention.

First Embodiment

Figure 1:
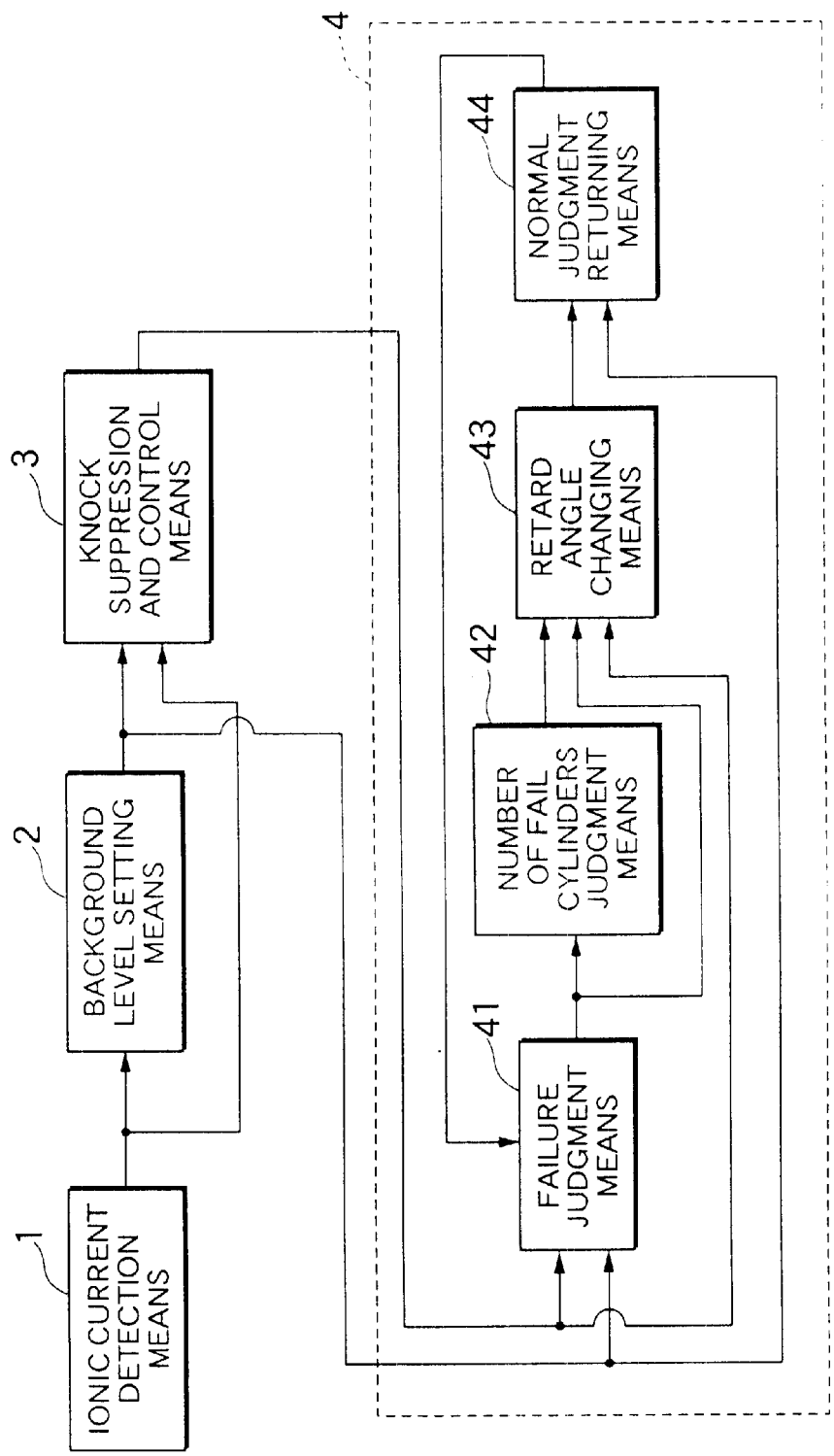
FIG. 1 is a functional block diagram showing a first embodiment according to the present invention.

FIG. 1 is a functional block diagram showing a first embodiment according to the present invention.

In FIG. 1, reference numeral 1 denotes ionic current detection means for generating a signal corresponding to knocking based on ionic current; 2, background level setting means for performing filter processing of a knock detected signal value from the ionic current detection means 1 and setting a background level, which serves as a knocking criterion, based on the filter value; 3, knock suppression and control means for judging the knocking based on the knock detected signal value and the background level to control at least ignition timing retard; and 4, fail control means for performing control when the knocking cannot be properly detected based on the output from the background level setting means 2 and the knock suppression and control means.

The fail control means 4 comprises: failure judgment means 41 for judging failure for each cylinder based on output from the background level setting means 2 and the knock suppression and control means; number of fail cylinders judgment means 42 for judging the number of fail cylinders based on output from the failure judgment means 41; retard angle changing means 43 for changing at least a retard angle of a fail cylinder based on output from the knock suppression and control means 3, the failure judgment means 41 and the number of fail cylinders judgment means 42; and normal judgment returning means for feeding back the output to the failure judgment means 41 to return to normal ignition timing retard when a cylinder during failure judgment meets normal judgment requirements based on the output from the background level setting means 2 and the retard angle changing means 43.

Next, with reference to FIGS. 2 to 5, a description will be made of an operation.

Figure 2:
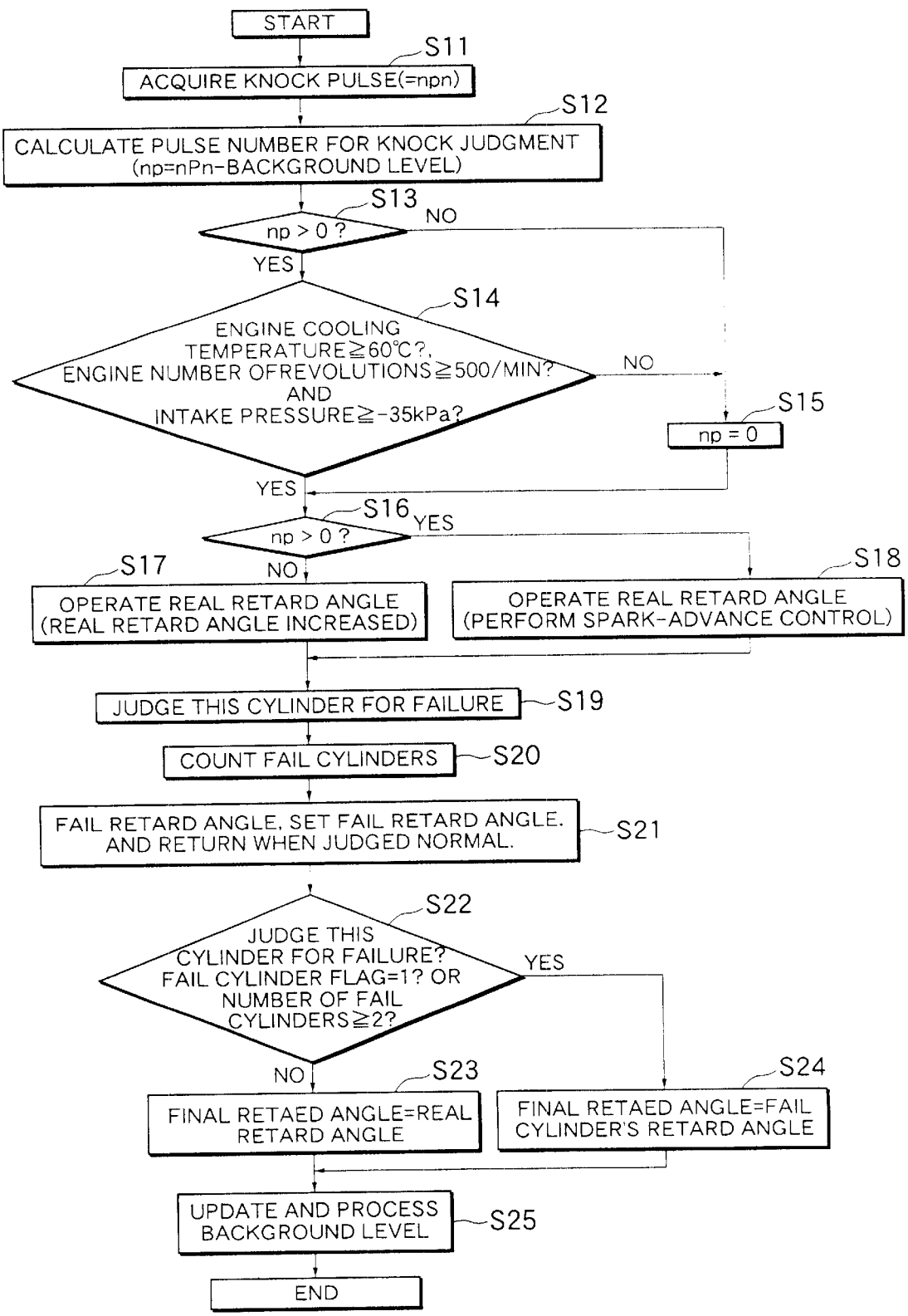
FIG. 2 is a flowchart showing the first embodiment according to the present invention.

FIG. 2 is an entire flowchart showing knock control processing according to the present embodiment. With reference to this flowchart, the description will be made of a flow of the entire processing.

First, a knock pulse number which occur in this ignition cycle and have been counted will be acquired (Step S11). Subsequently, a pulse number (np) for knock judgment will be calculated (Step S12). The pulse number for knock judgment can be obtained by deducting a background level to be described later, which is a noise pulse number, from the knock pulse number. If the pulse number (np) for knock judgment is 0 or less (N of Step S13), it is assumed that np=0 (Step S15) because it means knocking which has not occurred. If the pulse number (np) for knock judgment exceeds 1 (Y of Step S13), it means occurrence of knocking. In this case, it is judged whether or not the current operating condition is the operating range in which the knocking is controlled (Step S14).

As conditions for controlling the knocking, for example, engine cooling water temperature, a number of revolutions of the engine, intake pressure or the like are judged as shown in the flowchart (Step S14). If the knock control conditions are not met, it is assumed that np=0 (Step S15) irrespective of the value of the pulse number (np) for knock judgment because no knock control is performed. If the knock control conditions are met, if the pulse number (np) for knock judgment is 0 or less (Step S16), reduction control (spark-advance control) of the real retard angle is performed (Step S18) because it means knocking which has not occurred. If the pulse number (np) for knock judgment exceeds 1 (Step S16), the real retard angle is increased in accordance with the value of the pulse number (np) for knock judgment (Step S17) because it means the occurrence of knock.

Subsequently, failure of this cylinder is judged (Step S19), a number of fail cylinders is summed up (Step S20), if this cylinder is under judgment for failure, a fail retard angle is set in accordance with the number of fail cylinders, it is judged whether or not the normal returning condition is met, and if the normal returning condition is met, the failure judgment is stopped (Step S21).

Subsequently, if this cylinder is not being judged for failure (N of Step S22), the real retard angle will be copied on a final retard angle (Step S23), and if this cylinder is under judgment for failure (Y of Step S22), the fail retard angle will be copied on the final retard angle (Step S24). The ignition timing of the next cylinder concerned will be determined based on this final retard angle. Finally, the background level will be updated and processed based on this knock pulse number (Step S25).

In this flowchart, knock information for each ignition is inputted into the arithmetic unit in pulse number, but a digital value obtained by A-D converting a peak hold value of knock vibration waveform or an integral value may be inputted.

Figure 3:
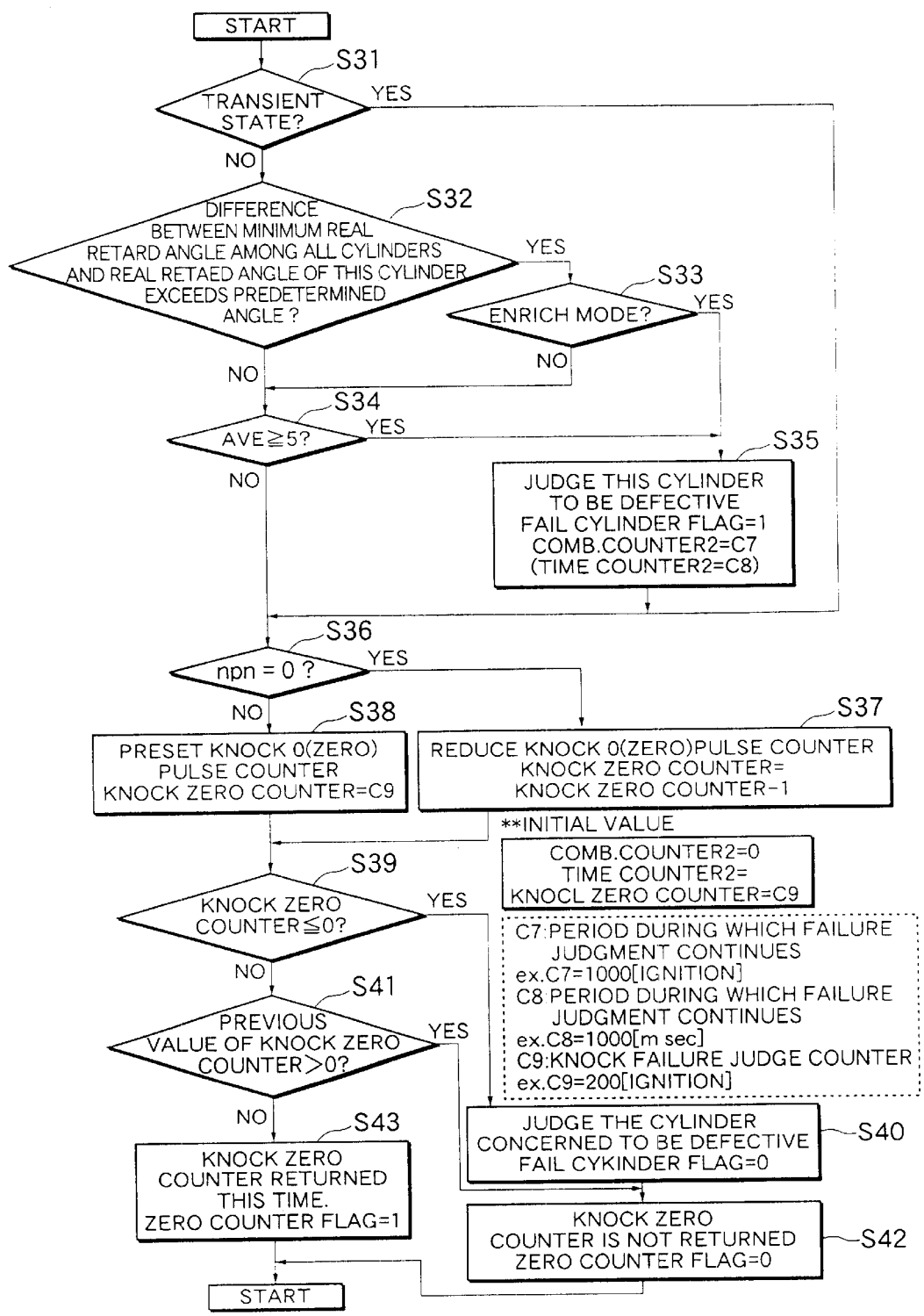
FIG. 3 is a flowchart showing the first embodiment according to the present invention.

FIG. 3 is a flowchart showing a portion of failure judgment according to the present embodiment. With reference to this flowchart, the description will be made of a method for judging failure.

First, it is judged whether or not the operating state is a transient operating state (Step S31), and if not the transient operating state, it is judged whether or not a difference between the minimum retard angle in all the cylinders and the real retard angle of this cylinder is equal to or larger than a predetermined angle (Step S32). As the predetermined angle, the minimum difference in real retard angle between cylinders which could not occur in a normal state will be set. If there is a larger difference than the above described predetermined angle and the current target air fuel ratio is on a rich side (Step S33), this cylinder will be judged to be defective because there is a high possibility that noise is superimposed on ionic current due to adhesion of soot to the plugs (Step S35).

Conversely, the failure judgment may be performed by judging whether or not a difference between the maximum retard angle and the real retard angle of this cylinder is larger than a predetermined angle. In this case, as causes for the failure, there can be conceived that the ionic current and knock signal could not be properly detected such as defective ionic current detection circuit for the cylinder concerned, defective ionic current detection line for the cylinder concerned or the like.

In the case of performing both judgment as to whether or not a difference between the maximum retard angle and the real retard angle of this cylinder is larger than a predetermined angle, and judgment as to whether or not a difference between the minimum retard angle and the real retard angle of this cylinder is larger than a predetermined angle, it is necessary to perform failure judgment by judging which is correct, a cylinder having the maximum retard angle or a cylinder having the minimum retard angle rather than real retard angles of the other cylinders.

Also, as another method for judging failure, it is judged whether or not the filter value is abnormally increased (Step S34). As an example, it is judged here whether or not the average value of knock pulse numbers inputted exceeds 5. The average value is calculated by, for example, the following equation.

$$AVE(t)=AVE(t31\ 1)*0.9+npn*0.1$$

If the average value exceeds 5, this cylinder will be judged to be defective because temporary radio wave noise superimposition on ionic current, noise superimposition due to contaminated plugs or the like are conceivable and therefore there is a high possibility that knock cannot be properly detected (Step S35). During failure judgment, a fail cylinder flag and a comb. counter 2, which have been provided for each cylinder, will be set. The fail cylinder flag is a flag indicating whether it is under judgment for failure or in a normal state for each cylinder, and the comb. Counter 2 indicates waiting time until it is returned to normal knock control after returned to normal judgment, taking safety into consideration.

Also, the comb. counter 2 is used to set a number of times of ignition, but it may be set in time as a time counter. Judgment of the waiting time may be set by either the comb. counter 2 or the time counter in this manner. Further, there may be adopted an alternative type in which both are used and any of them, in which the period is earlier terminated, becomes effective.

In this flowchart, it has first been judged whether or not the operating state is the transient operating state (Step S31). This is because the above described "minimum difference in retard angle between cylinders which could not occur in a normal state" may occur during abrupt acceleration even if not in a defective state, and the above described abnormal rise in the filter value may also occur even if not in a defective state because the noise pulse is also increased, and therefore the failure judgment should not be performed.

Subsequently, it is judged whether or not this input knock pulse number npn is 0 (Step S36). If it is 0, a knock zero counter is reduced by 1 (Step S37). If the npn is not 0, the knock zero counter will be preset to an initial value C9 (Step S38). Therefore, if a state, in which the input knock pulse number is 0, continues during ignition of C9, the knock zero counter will become 0. The knock zero counter is provided for each cylinder, and if it is 0, the knock pulse number will be judged to be in an abnormal state. Although not described on this flowchart, there is present an operating condition, in which the noise pulse number is almost 0, at low rotation, and therefore, under such an operating condition, it is preferable not to perform this processing (Steps S6, S7 and S8). Accordingly, there may be provided operating condition judgment for executing this processing.

Subsequently, it is judged whether or not the knock zero counter is 0 or less (Step S39). If it is 0 or less, the cylinder concerned will be judged to be defective (Step S40). A flag, zero counter flag, indicating whether or not this knock pulse number has returned to the normal state from the abnormal state, will be reset to 0 (Step S42). If the knock zero counter is not 0 or less, it will be judged whether or not the previous knock zero counter has been larger than 0 (Step S41). If it has been larger than 0, the zero counter flag will be reset to 0 (Step S42). If it has been 0 or less, the zero counter flag will be set to 1 (Step S43).

Figure 4:
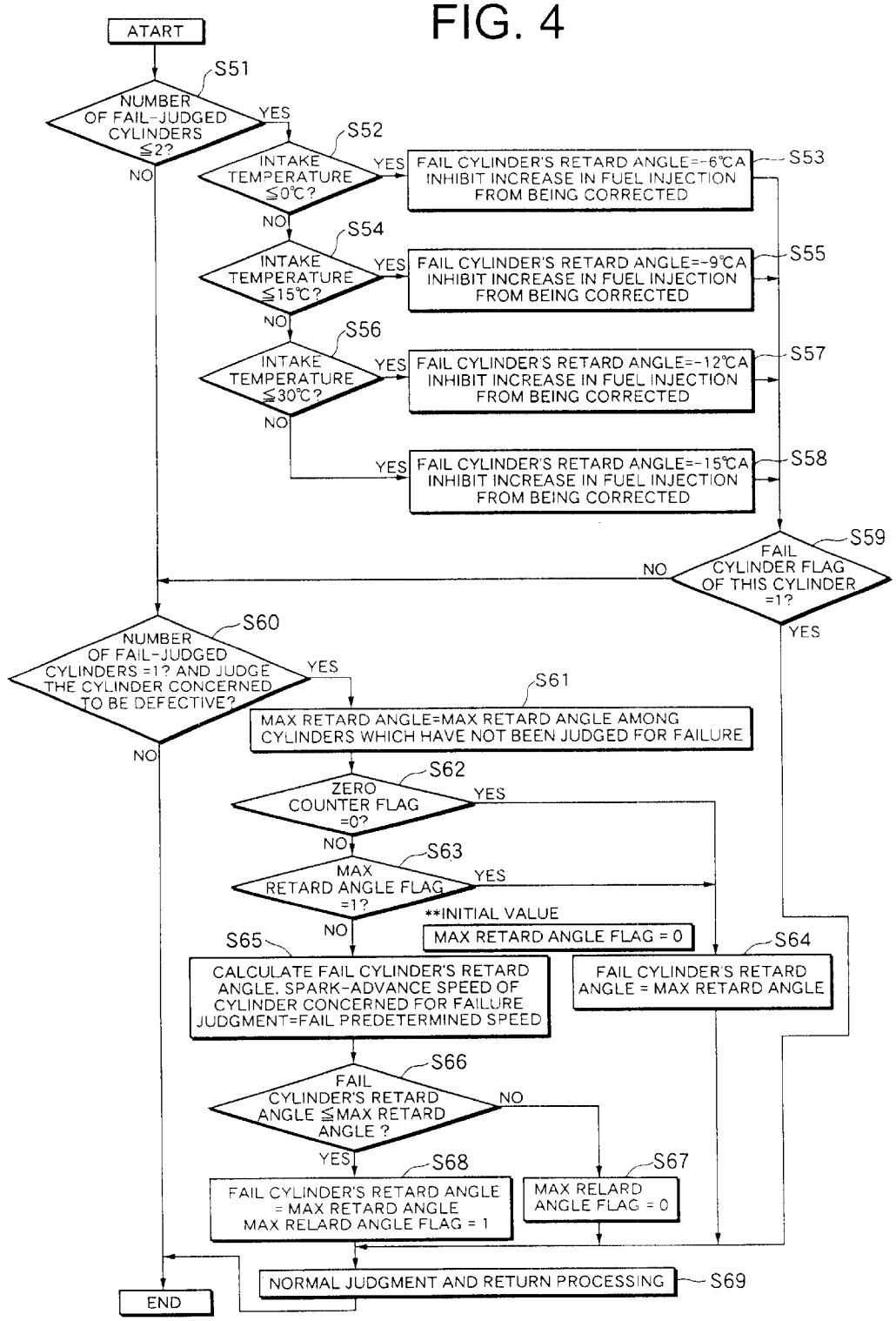
FIG. 4 is a flowchart showing the first embodiment according to the present invention.

FIG. 4 is a flowchart showing a portion of operation of fail retard angle according to the present embodiment. With reference to this flowchart, the description will be made of a method for operating the fail retard angle.

In the main flow (FIG. 2), a number of fail cylinders has been counted (Step S20 of FIG. 2) prior to the operation of fail retard angle, and the number of fail cylinders has been recognized based on the fail cylinder flag.

First, if the number of fail cylinders is 2 or more (Step S51), the fail cylinder's retard angle of this cylinder will set based on the intake temperature (Steps S52, S53, S54, S55, S56, S57 and S58). Next, it is judged whether or not this cylinder is under judgment for failure (Step S59), and if under judgment for failure, a "processing for returning to normal judgment" will be executed.

Subsequently, if the number of fail cylinders is one and this cylinder is under judgment for failure (Step S60), the maximum retard angle among cylinders, which have not been judged to be defective, will be judged, and copied on the maximum retard angle (Step S61). Subsequently, it is judged whether or not the zero counter flag is 0 (Step S62), and if it is 0, the maximum retard angle will be copied on the fail cylinder's retard angle of this cylinder because the knock pulse number has been judged to be in an abnormal state (Step S64). Subsequently, it is judged whether or not a maximum retard angle flag indicating whether or not the fail cylinder's retard angle has already reached the maximum retard angle once, has been set (Step S63). If it has been set, the maximum retard angle will be copied on the fail cylinder's retard angle of this cylinder (Step S64).

On a cylinder having an abnormally large real retard angle which has been judged to be defective, the maximum retard angle will be copied immediately, and in order to prevent knock from occurring when the ignition timing is abruptly advanced, the fail cylinder's retard angle will be advanced at a predetermined speed (Step S65). If the fail cylinder's retard angle reaches the maximum retard angle (Step S66), the maximum retard angle will be copied on the fail cylinder's retard angle to set the maximum retard angle flag (Step S68). Until the fail cylinder's retard angle reaches the maximum retard angle, the maximum retard flag will be continuously reset to 0 (Step S67).

The fail cylinder's retard angle has been set by the use of the maximum retard angle among cylinders, which have not been judged to be defective, here, but it may be set based on the average value of the real retard angles of the cylinders, which have not been judged to be defective, or the real retard angle of a cylinder adjacent to the fail cylinder.

It is assumed here that the real retard angle of the fail cylinder (this cylinder) is larger than that of any of the other cylinders, but when the real retard angle of the fail cylinder (this cylinder) is smaller than that of any of the other cylinders, such as a case of performing failure judgment by judging whether or not the difference between the maximum retard angle and the real retard angle of this cylinder is larger than a predetermined angle, in addition to the above described assumption, the maximum retard angle may be immediately copied on the fail cylinder's retard angle of this cylinder.

Figure 5:
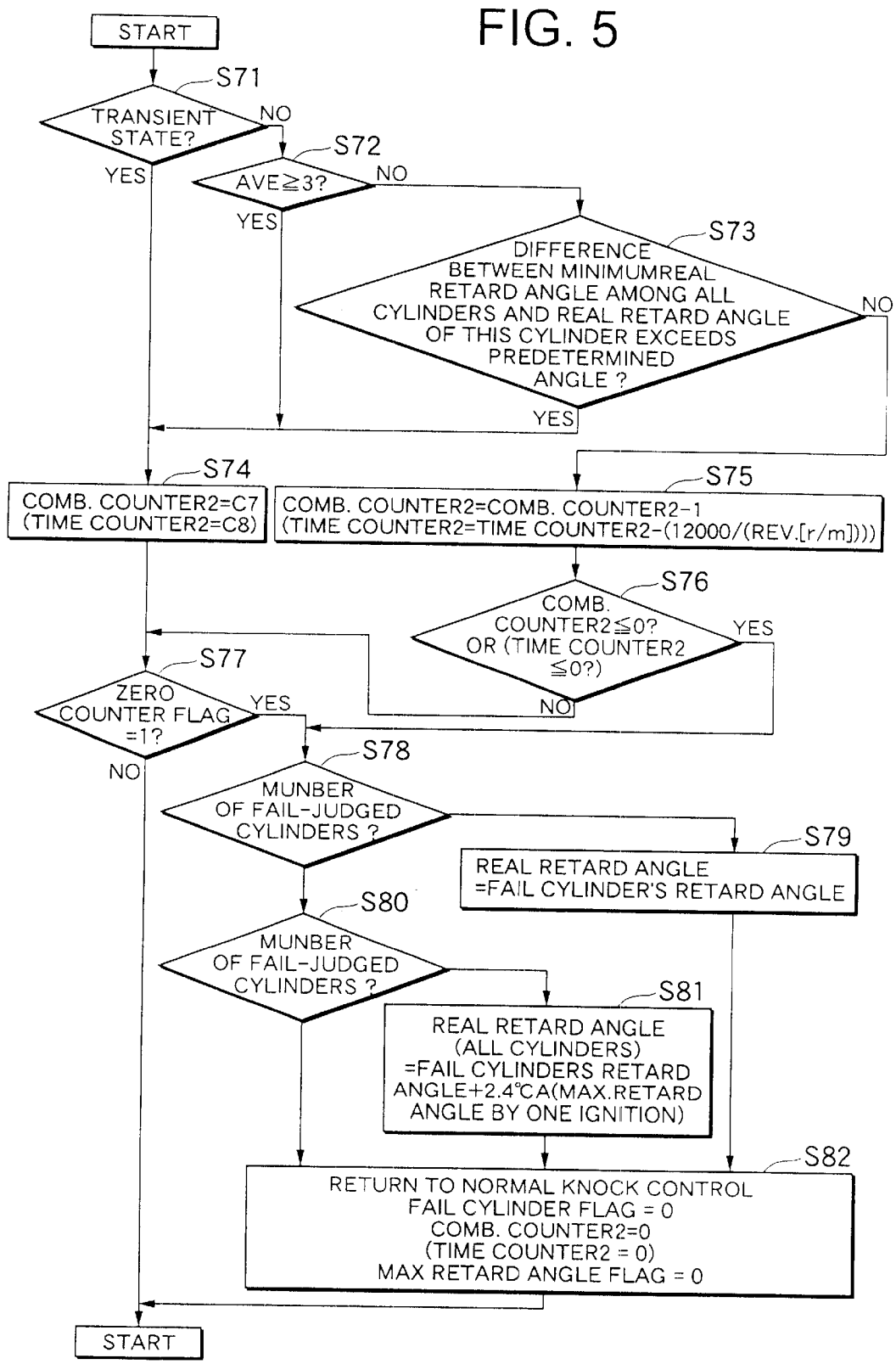
FIG. 5 is a flowchart showing the first embodiment according to the present invention.

FIG. 5 is a flowchart showing portions of normal judgment and returning processing according to the present embodiment. With reference to this flowchart, the description will be made of methods for the normal judgment and returning processing.

As described above, the "minimum difference in real retard angle between cylinders which could not occur in a normal state" may occur during abrupt acceleration even if not in a defective state, and the above described abnormal rise in the filter value may also occur even if not in a defective state because the noise pulse is also increased, and therefore the normal judgment should not be performed. Therefore, it is first judged whether or not the operating state is a transient state (Step S71). Subsequently, as an example, it is judged here whether or not the average value is lower than 3 (Step S72), and further it is judged whether or not the difference between the minimum retard angle of all the cylinders and the real retard angle of this cylinder is lower than a predetermined angle (Step S73).

If these conditions are all satisfied, it will be judged that it has been returned to the normal state to reduce the comb. counter 2 (Step S75). Subsequently, it is judged whether or not the comb. counter 2 is equal to or less than 0 (Step S76). On the other hand, if the normal state requirements are not satisfied even once, the comb. counter 2 will be preset (Step S74). Therefore, if it has been judged to be normal continuously for a certain number of times of ignition which have been set on the comb. counter 2, the returning processing described in Step S78 or later will be performed. Also, if a flag, zero counter flag, indicating whether or not this knock pulse number has returned to the normal state from the abnormal state is 1 (Step S77), the returning processing described in Step S78 or later will be similarly performed.

Subsequently, the number of fail-judged cylinders is judged (Steps S78 and S80), and if it is 1, the fail cylinder's retard angle will be copied on the real retard angle (Step S79) and thereafter, the cylinder concerned will be returned to the normal knock control (Step S82). As the processing for returning to the normal knock control, the fail cylinder flag will be set to 0, the comb. counter 2, to 0, and the maximum retard angle flag, to 0.

If the number of fail-judged cylinders is 2, the fail cylinder's retard angle will be copied on the real retard angles of all the cylinders (Step S81) and thereafter, the cylinder concerned will be returned to the normal knock control (Step S82).

If the number of fail-judged cylinders exceeds 3, only the cylinder concerned will be returned to the normal control (Step S82).

In the present embodiment, the real retard angles of all the cylinders have been nullified with respect to the ignition timing control by the number of fail-judged cylinders being 2 or more to correct the ignition timing of all the cylinders by the use of a predetermined real retard angle. This number of the cylinders should be set based on the characteristics of the knock signal detection unit based on ionic current, of course, the number of cylinders in the internal-combustion engine and installation conditions of the knock signal processing circuit.

What is claimed is:

1. A knock control apparatus for internal-combustion engine, comprising:
    ionic current detection means for generating a signal corresponding to a knock based on ionic current;
    background level setting means for filter-processing a knock detected signal value from said ionic current detection means to set a background level, which serves as a knock criterion, based on a filter value;
    knock suppression and control means for judging the knock based on said knock detected signal value and said background level to control at least ignition timing retard; and
    fail control means for performing control when knock detection cannot be properly performed, wherein
    said fail control means comprises:
        failure judgment means for judging failure for each cylinder based on output from said background level setting means and said knock suppression and control means;
        number of fail cylinders judgment means for judging a number of fail cylinders based on the output from said fail judgment means;
        retard angle changing means for changing at least the retard angle of a fail cylinder based on the output from said knock suppression and control means, said fail judgment means and said number of fail cylinders judgment means; and
        normal judgment returning means for returning to normal ignition timing retard when a cylinder under judgment for failure meets normal judgment requirements based on the output from said background level setting means and said retard angle changing means.

2. The knock control apparatus for internal-combustion engine according to claim 1, wherein said failure judgment means judges, to be defective, a cylinder having a retard angle, which is a predetermined angle or more larger than a minimum value among retard angles of each cylinder.

3. The knock control apparatus for internal-combustion engine according to claim 1, wherein said background level setting means performs filter processing for each cylinder and said failure judgment means judges, to be defective, a cylinder whose filter value exceeds a predetermined value.

4. The knock control apparatus for internal-combustion engine according to claim 1, wherein if a number of fail cylinders exceeds a predetermined number of cylinders, said retard angle changing means nullifies the real retard angles for all the cylinders with respect to the ignition timing control and corrects the ignition timing for all the cylinders by the use of a predetermined retard angle.

5. The knock control apparatus for internal-combustion engine according to claim 4, wherein said predetermined retard angle is set at least based on either the intake temperature or the engine cooling water temperature.

6. The knock control apparatus for internal-combustion engine according to claim 1, wherein if the number of fail cylinders is under a predetermined number of cylinders, said retard angle changing means nullifies the retard angles for the fail cylinders with respect to the ignition timing control and sets the retard angle for the fail cylinder based on the retard angle for a cylinder, which has not been judged to be defective, to correct the ignition timing for the cylinder concerned based on the retard angle for the fail cylinder.

7. The knock control apparatus for internal-combustion engine according to claim 6, wherein said retard angle changing means brings an amount of correction in ignition timing of a fail-judged cylinder close to the retard angle for said fail cylinder at a predetermined speed.

8. The knock control apparatus for internal-combustion engine according to claim 1, wherein said normal judgment returning means judges that at least the retard angle of said fail cylinder is not a predetermined angle or more larger than the retard angles of the other cylinders, and that the filter value of said fail cylinder is equal to or less than a predetermined value, and stops the failure judgment.

9. The knock control apparatus for internal-combustion engine according to claim 8, wherein if a number of fail-judged cylinders is under a predetermined number of cylinders, when it stops the failure judgment for any of said fail-judged cylinders, said normal judgment returning means replaces the retard angle of said cylinder concerned with a retard angle having the maximum value among retard angles of the cylinders, which have not been judged to be defective, and makes the retard angle of said cylinder concerned effective with respect to the ignition timing control.

10. The knock control apparatus for internal-combustion engine according to claim 8, wherein if the number of fail-judged cylinders exceeds a predetermined number of cylinders, said normal judgment returning means stops the failure judgment for some fail-judged cylinders; if the number of fail cylinders is under the predetermined number of cylinders, the retard angle for any cylinder other than said fail cylinders is replaced with a retard angle a predetermined number of cylinders, the retard angle for any cylinder other than said fail cylinders is replaced with a retard angle a predetermined angle smaller than said predetermined real retard angle, and is made effective with respect to the ignition timing control; and the real retard angle for said fail cylinder is nullified with respect to the ignition timing control and the ignition timing of said cylinder concerned is corrected based on the maximum value among the retard angles of cylinders which have not been judged to be defective.

11. The knock control apparatus for internal-combustion engine according to claim 10, wherein said predetermined angle is equal to an increase in the maximum retard angle which can be increased by one knock detection.

* * * * *